(No Model.)

S. CLARKE.
CUP FOR FOOD WARMERS.

No. 399,741. Patented Mar. 19, 1889.

Witnesses.
Lloyd B. Wight.
Baltus De Jong.

Inventor.
Samuel Clarke
by his Attorneys
Baldwin Davidson & Wight.

UNITED STATES PATENT OFFICE.

SAMUEL CLARKE, OF CHILDS HILL, COUNTY OF MIDDLESEX, ENGLAND.

CUP FOR FOOD-WARMERS.

SPECIFICATION forming part of Letters Patent No. 399,741, dated March 19, 1889.

Application filed May 21, 1888. Serial No. 274,550. (No model.)

*To all whom it may concern:*

Be it known that I, SAMUEL CLARKE, night-light manufacturer, a subject of the Queen of Great Britain, residing at the Pyramid Works, Childs Hill, in the county of Middlesex, England, have invented certain new and useful Improvements in Cups for Food-Warmers, of which the following is a specification.

Food-warmers as commonly made by me are formed with a porcelain cup, the lower end of which passes down into a metal ring surrounded by water kept heated by a night-light burning below it.

The object of my invention is to form cups of this kind in such a manner that food may readily be poured out or drunk up from them without spilling, and also in such manner that any grease or scum floating on the surface of the food may be stopped back and retained within the cup. The cup I form with a projecting lip at the top, as heretofore, and also with a cover over the top for a distance in rear of the lip. From this cover a passage passes downward nearly to the bottom of the cup. At the bottom it is open to the interior of the cup, while at the top it is open to the spout, and all passage of liquid to the spout, except through the passage, is entirely cut off. In this way the exterior of the lower part of the cup still remains of a circular form, so that it may, as before, be surrounded with a hot-water bath, while at the same time food may be drunk or poured off from it without any of the scum or grease which may be floating on its surface passing off with it, as the food will be drawn or flow off from the bottom of the cup, while the cover will prevent any food from flowing over the top as it is being poured off. The cover at the top of the cup is extended over the vertical passage toward the edge of the lip, so as to reduce the size of the delivery-opening and permit the liquid to flow out in a sufficiently large stream without spilling over the sides of the cup.

Figure 1:
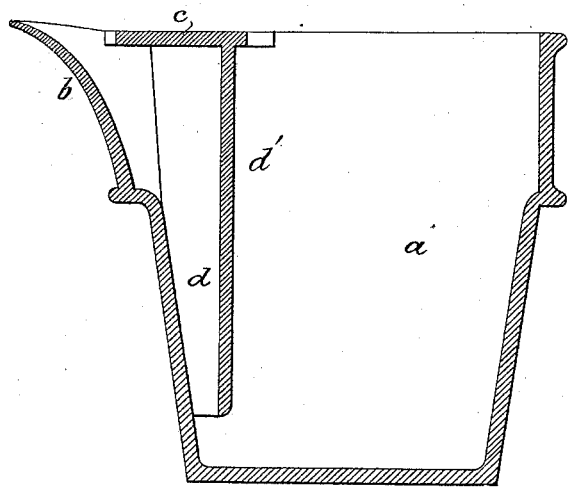
Figure 2:
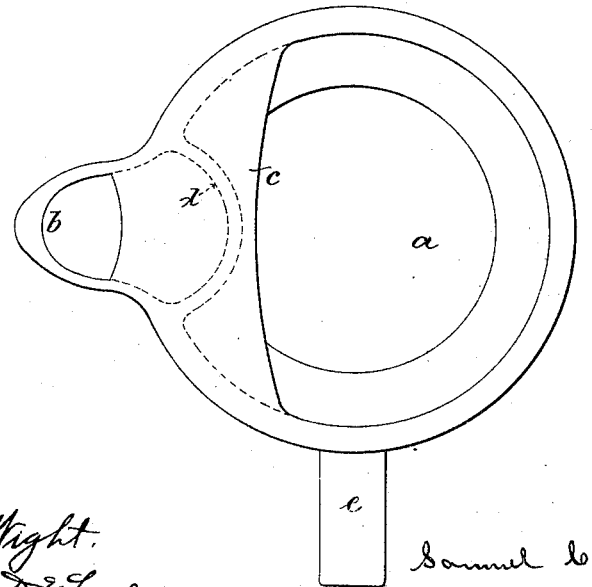

Figure 1 is a transverse section, and Fig. 2 a plan.

*a* is the cup with its lower end made circular in cross-section and slightly tapered, and formed at the top of larger diameter than at the bottom, in order that it may rest on the top of the ring that is to support it.

*b* is the projecting lip, and *c* the cover over the top for a distance in rear of this lip.

*d* is the tube or passage passing downward from the cover *c* nearly to the bottom of the cup. As will be seen, the cover *c* extends part way across the passage *d*, at the top, and causes the liquid to flow out over the front edge of the lip *b*. The tube *d* is formed by the partition *d'*, which extends from the cover *c* nearly to the bottom of the cup, adjacent to the front edge of the same.

*e* is a handle.

What I claim is—

A cup for food-warmers, having its lower portion circular in cross-section and of less diameter than the upper portion, and having also a projecting lip at the top and a cover extending over the top of the cup toward the front edge of the lip to reduce or regulate the size of the delivery-opening at the lip, and also extending in an opposite direction over a portion of the main body of the cup, said cup being formed with a tube or passage on its front side passing downwardly from the lip under the cover to near the bottom of the cup, substantially as described.

SAMUEL CLARKE.

Witnesses:
   JNO. H. WHITEHEAD,
  24 *Southampton Buildings, London, W. C.*
   WALTER J. SKERTEN,
  17 *Gracechurch Street, London, E. C.*